(12) United States Patent
Bloch et al.

(10) Patent No.: US 10,448,119 B2
(45) Date of Patent: Oct. 15, 2019

(54) METHODS AND SYSTEMS FOR UNFOLDING VIDEO PRE-ROLL

(71) Applicant: JBF Interlude 2009 LTD—Israel, Tel Aviv-Jaffa (IL)

(72) Inventors: Jonathan Bloch, Brooklyn, NY (US); Barak Feldman, Tenafly, NJ (US); Tal Zubalsky, Tel Aviv-Jaffa (IL); Yuval Hofshy, Kfar Saba (IL)

(73) Assignee: JBF Interlude 2009 LTD, Tel Aviv-Jaffa (IL)

( * ) Notice: Subject to any disclaimer, the term of this patent is extended or adjusted under 35 U.S.C. 154(b) by 0 days.

(21) Appl. No.: 14/107,600

(22) Filed: Dec. 16, 2013

(65) Prior Publication Data

US 2015/0067723 A1     Mar. 5, 2015

Related U.S. Application Data

(60) Provisional application No. 61/872,005, filed on Aug. 30, 2013.

(51) Int. Cl.
| | |
|---|---|
| *H04N 21/234* | (2011.01) |
| *H04N 21/236* | (2011.01) |
| *H04N 21/2389* | (2011.01) |
| *H04N 21/262* | (2011.01) |
| *H04N 21/44* | (2011.01) |
| *H04N 21/81* | (2011.01) |

(Continued)

(52) U.S. Cl.
CPC ....... *H04N 21/812* (2013.01); *H04N 21/4325* (2013.01); *H04N 21/458* (2013.01); *H04N 21/472* (2013.01)

(58) Field of Classification Search
None
See application file for complete search history.

(56) References Cited

U.S. PATENT DOCUMENTS

| 4,569,026 A | 2/1986 | Best |
| 5,161,034 A | 11/1992 | Klappert |

(Continued)

FOREIGN PATENT DOCUMENTS

| CA | 2639491 A1 | 3/2010 |
| DE | 004038801 A1 | 6/1992 |

(Continued)

OTHER PUBLICATIONS

An ffmpeg and SDL Tutorial, "Tutorial 05: Synching Video," Retrieved from internet on Mar. 15, 2013: <http://dranqer.com/ffmpeg/tutorial05.html>, (4 pages).

(Continued)

*Primary Examiner* — Brian T Pendleton
*Assistant Examiner* — Jean D Saint Cyr
(74) *Attorney, Agent, or Firm* — Goodwin Procter LLP

(57) ABSTRACT

Method and accompanying system for an unfolding video pre-roll. A primary video having a fixed play length is presented and, in temporal proximity to at least a portion of the primary video, an unfolding video having a variable play length is presented to the viewer. If an interaction is received from the viewer during the playback of the unfolding video, the play length of the unfolding video is extended by adding a seamlessly connected video segment to the unfolding video, which is continuously presented to the viewer without interruption.

18 Claims, 6 Drawing Sheets

(51) Int. Cl.
*H04N 21/432* (2011.01)
*H04N 21/458* (2011.01)
*H04N 21/472* (2011.01)

(56) References Cited

U.S. PATENT DOCUMENTS

| | | | |
|---|---|---|---|
| 5,568,602 A | 10/1996 | Callahan et al. | |
| 5,607,356 A | 3/1997 | Schwartz | |
| 5,636,036 A | 6/1997 | Ashbey | |
| 5,676,551 A | 10/1997 | Knight et al. | |
| 5,734,862 A | 3/1998 | Kulas | |
| 5,737,527 A | 4/1998 | Shiels et al. | |
| 5,745,738 A | 4/1998 | Ricard | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,482 B1 | 10/2001 | Seidman et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,801,947 B1 | 10/2004 | Li | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,276,058 B2 | 9/2012 | Gottlieb et al. | |
| 8,281,355 B1 * | 10/2012 | Weaver et al. | 725/110 |
| 8,600,220 B2 | 12/2013 | Bloch et al. | |
| 8,612,517 B1 | 12/2013 | Yadid et al. | |
| 8,650,489 B1 | 2/2014 | Baum et al. | |
| 8,667,395 B2 | 3/2014 | Hosogai et al. | |
| 8,826,337 B2 | 9/2014 | Issa et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,390,099 B1 | 7/2016 | Wang et al. | |
| 9,465,435 B1 | 10/2016 | Zhang et al. | |
| 9,520,155 B2 | 12/2016 | Bloch et al. | |
| 9,530,454 B2 | 12/2016 | Bloch et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 2002/0053089 A1 | 5/2002 | Massey | |
| 2002/0086724 A1 | 7/2002 | Miyaki et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0124250 A1 * | 9/2002 | Proehl | H04N 7/17318 725/32 |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0148806 A1 | 8/2003 | Weiss | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0019905 A1 | 1/2004 | Fellenstein et al. | |
| 2004/0034711 A1 | 2/2004 | Hughes | |
| 2004/0070595 A1 | 4/2004 | Atlas et al. | |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2005/0019015 A1 | 1/2005 | Ackley et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0166224 A1 | 7/2005 | Ficco | |
| 2005/0198661 A1 | 9/2005 | Collins et al. | |
| 2005/0210145 A1 | 9/2005 | Kim et al. | |
| 2005/0251820 A1 | 11/2005 | Stefanik et al. | |
| 2006/0002895 A1 | 1/2006 | McDonnell et al. | |
| 2006/0024034 A1 | 2/2006 | Filo et al. | |
| 2006/0028951 A1 | 2/2006 | Tozun et al. | |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0222322 A1 | 10/2006 | Levitan | |
| 2006/0224260 A1 | 10/2006 | Hicken et al. | |
| 2006/0274828 A1 | 12/2006 | Siemens et al. | |
| 2007/0003149 A1 | 1/2007 | Nagumo et al. | |
| 2007/0024706 A1 | 2/2007 | Brannon et al. | |
| 2007/0033633 A1 | 2/2007 | Andrews et al. | |
| 2007/0099684 A1 | 5/2007 | Butterworth | |
| 2007/0101369 A1 | 5/2007 | Dolph | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0226761 A1 | 9/2007 | Zalewski et al. | |
| 2007/0239754 A1 | 10/2007 | Schnitman | |
| 2007/0253677 A1 | 11/2007 | Wang | |
| 2007/0253688 A1 | 11/2007 | Koennecke | |
| 2007/0263722 A1 | 11/2007 | Fukuzawa | |
| 2008/0019445 A1 | 1/2008 | Aono et al. | |
| 2008/0021187 A1 * | 1/2008 | Wescott | C09J 189/00 527/301 |
| 2008/0021874 A1 * | 1/2008 | Dahl | G06F 17/30899 |
| 2008/0022320 A1 | 1/2008 | Ver Steeg | |
| 2008/0031595 A1 | 2/2008 | Cho | |
| 2008/0086456 A1 | 4/2008 | Rasanen et al. | |
| 2008/0086754 A1 | 4/2008 | Chen et al. | |
| 2008/0091721 A1 | 4/2008 | Harboe et al. | |
| 2008/0092159 A1 * | 4/2008 | Dmitriev et al. | 725/34 |
| 2008/0148152 A1 | 6/2008 | Blinnikka et al. | |
| 2008/0170687 A1 | 7/2008 | Moors et al. | |
| 2008/0177893 A1 | 7/2008 | Bowra et al. | |
| 2008/0178232 A1 | 7/2008 | Velusamy | |
| 2008/0276157 A1 | 11/2008 | Kustka et al. | |
| 2008/0300967 A1 | 12/2008 | Buckley et al. | |

(56) References Cited

U.S. PATENT DOCUMENTS

| | | | |
|---|---|---|---|
| 2008/0301750 A1* | 12/2008 | Silfvast | H04N 7/17318 |
| | | | 725/131 |
| 2008/0314232 A1 | 12/2008 | Hansson et al. | |
| 2009/0022015 A1 | 1/2009 | Harrison | |
| 2009/0022165 A1 | 1/2009 | Candelore et al. | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0077137 A1 | 3/2009 | Weda et al. | |
| 2009/0079663 A1 | 3/2009 | Chang et al. | |
| 2009/0083631 A1 | 3/2009 | Sidi et al. | |
| 2009/0116817 A1 | 5/2009 | Kim et al. | |
| 2009/0177538 A1 | 7/2009 | Brewer et al. | |
| 2009/0191971 A1 | 7/2009 | Avent | |
| 2009/0195652 A1 | 8/2009 | Gal | |
| 2009/0199697 A1 | 8/2009 | Lehtiniemi et al. | |
| 2009/0228572 A1 | 9/2009 | Wall et al. | |
| 2009/0254827 A1 | 10/2009 | Gonze et al. | |
| 2009/0258708 A1 | 10/2009 | Figueroa | |
| 2009/0265746 A1 | 10/2009 | Halen et al. | |
| 2009/0297118 A1 | 12/2009 | Fink et al. | |
| 2009/0320075 A1 | 12/2009 | Marko | |
| 2010/0017820 A1 | 1/2010 | Thevathasan et al. | |
| 2010/0042496 A1* | 2/2010 | Wang et al. | 705/14.49 |
| 2010/0077290 A1 | 3/2010 | Pueyo | |
| 2010/0088726 A1 | 4/2010 | Curtis et al. | |
| 2010/0146145 A1 | 6/2010 | Tippin et al. | |
| 2010/0153512 A1 | 6/2010 | Balassanian et al. | |
| 2010/0161792 A1 | 6/2010 | Palm et al. | |
| 2010/0162344 A1 | 6/2010 | Casagrande et al. | |
| 2010/0167816 A1 | 7/2010 | Perlman et al. | |
| 2010/0186032 A1 | 7/2010 | Pradeep et al. | |
| 2010/0186579 A1 | 7/2010 | Schnitman | |
| 2010/0210351 A1 | 8/2010 | Berman | |
| 2010/0262336 A1 | 10/2010 | Rivas et al. | |
| 2010/0267450 A1 | 10/2010 | McMain | |
| 2010/0268361 A1 | 10/2010 | Mantel et al. | |
| 2010/0278509 A1 | 11/2010 | Nagano et al. | |
| 2010/0287033 A1 | 11/2010 | Mathur | |
| 2010/0287475 A1 | 11/2010 | van Zwol et al. | |
| 2010/0293455 A1 | 11/2010 | Bloch | |
| 2010/0332404 A1 | 12/2010 | Valin | |
| 2011/0000797 A1 | 1/2011 | Henry | |
| 2011/0007797 A1 | 1/2011 | Palmer et al. | |
| 2011/0010742 A1 | 1/2011 | White | |
| 2011/0026898 A1 | 2/2011 | Lussier et al. | |
| 2011/0033167 A1 | 2/2011 | Arling et al. | |
| 2011/0041059 A1 | 2/2011 | Amarasingham et al. | |
| 2011/0078023 A1 | 3/2011 | Aldrey et al. | |
| 2011/0078740 A1 | 3/2011 | Bolyukh et al. | |
| 2011/0096225 A1 | 4/2011 | Candelore | |
| 2011/0126106 A1 | 5/2011 | Ben Shaul et al. | |
| 2011/0131493 A1 | 6/2011 | Dahl | |
| 2011/0138331 A1 | 6/2011 | Pugsley et al. | |
| 2011/0163969 A1 | 7/2011 | Anzures et al. | |
| 2011/0191684 A1 | 8/2011 | Greenberg | |
| 2011/0191801 A1 | 8/2011 | Vytheeswaran | |
| 2011/0197131 A1 | 8/2011 | Duffin et al. | |
| 2011/0200116 A1 | 8/2011 | Bloch et al. | |
| 2011/0202562 A1 | 8/2011 | Bloch et al. | |
| 2011/0238494 A1* | 9/2011 | Park | G06Q 30/02 |
| | | | 705/14.46 |
| 2011/0246885 A1 | 10/2011 | Pantos et al. | |
| 2011/0252320 A1 | 10/2011 | Arrasvuori et al. | |
| 2011/0264755 A1 | 10/2011 | Salvatore De Villiers | |
| 2011/0282745 A1 | 11/2011 | Meoded et al. | |
| 2011/0282906 A1 | 11/2011 | Wong | |
| 2011/0307786 A1 | 12/2011 | Shuster | |
| 2011/0307919 A1 | 12/2011 | Weerasinghe | |
| 2011/0307920 A1 | 12/2011 | Blanchard et al. | |
| 2012/0004960 A1 | 1/2012 | Ma et al. | |
| 2012/0005287 A1 | 1/2012 | Gadel et al. | |
| 2012/0017141 A1 | 1/2012 | Eelen et al. | |
| 2012/0062576 A1 | 3/2012 | Rosenthal et al. | |
| 2012/0081389 A1 | 4/2012 | Dilts | |
| 2012/0089911 A1 | 4/2012 | Hosking et al. | |
| 2012/0094768 A1 | 4/2012 | McCaddon et al. | |
| 2012/0110618 A1 | 5/2012 | Kilar et al. | |
| 2012/0110620 A1 | 5/2012 | Kilar et al. | |
| 2012/0134646 A1 | 5/2012 | Alexander | |
| 2012/0147954 A1 | 6/2012 | Kasai et al. | |
| 2012/0179970 A1 | 7/2012 | Hayes | |
| 2012/0198412 A1 | 8/2012 | Creighton et al. | |
| 2012/0263263 A1 | 10/2012 | Olsen et al. | |
| 2012/0308206 A1 | 12/2012 | Kulas | |
| 2013/0028573 A1 | 1/2013 | Hoofien et al. | |
| 2013/0031582 A1 | 1/2013 | Tinsman et al. | |
| 2013/0039632 A1 | 2/2013 | Feinson | |
| 2013/0046847 A1 | 2/2013 | Zavesky et al. | |
| 2013/0054728 A1 | 2/2013 | Amir et al. | |
| 2013/0055321 A1 | 2/2013 | Cline et al. | |
| 2013/0061263 A1 | 3/2013 | Issa et al. | |
| 2013/0097643 A1 | 4/2013 | Stone et al. | |
| 2013/0117248 A1 | 5/2013 | Bhogal et al. | |
| 2013/0125181 A1 | 5/2013 | Montemayor et al. | |
| 2013/0129308 A1 | 5/2013 | Karn et al. | |
| 2013/0177294 A1 | 7/2013 | Kennberg | |
| 2013/0188923 A1 | 7/2013 | Hartley et al. | |
| 2013/0204710 A1* | 8/2013 | Boland | G06Q 50/01 |
| | | | 705/14.66 |
| 2013/0219425 A1 | 8/2013 | Swartz | |
| 2013/0254292 A1 | 9/2013 | Bradley | |
| 2013/0259442 A1 | 10/2013 | Bloch et al. | |
| 2013/0282917 A1 | 10/2013 | Reznik et al. | |
| 2013/0308926 A1 | 11/2013 | Jang et al. | |
| 2013/0328888 A1 | 12/2013 | Beaver et al. | |
| 2014/0019865 A1 | 1/2014 | Shah | |
| 2014/0025839 A1 | 1/2014 | Marko et al. | |
| 2014/0040273 A1 | 2/2014 | Cooper et al. | |
| 2014/0040280 A1 | 2/2014 | Slaney et al. | |
| 2014/0046946 A2 | 2/2014 | Friedmann et al. | |
| 2014/0078397 A1 | 3/2014 | Bloch et al. | |
| 2014/0082666 A1* | 3/2014 | Bloch | G11B 27/34 |
| | | | 725/37 |
| 2014/0085196 A1 | 3/2014 | Zucker et al. | |
| 2014/0094313 A1 | 4/2014 | Watson et al. | |
| 2014/0101550 A1 | 4/2014 | Zises | |
| 2014/0129618 A1 | 5/2014 | Panje et al. | |
| 2014/0152564 A1 | 6/2014 | Gulezian et al. | |
| 2014/0156677 A1 | 6/2014 | Collins, III et al. | |
| 2014/0178051 A1 | 6/2014 | Bloch et al. | |
| 2014/0186008 A1 | 7/2014 | Eyer | |
| 2014/0194211 A1 | 7/2014 | Chimes et al. | |
| 2014/0220535 A1 | 8/2014 | Angelone | |
| 2014/0237520 A1 | 8/2014 | Rothschild et al. | |
| 2014/0245152 A1 | 8/2014 | Carter et al. | |
| 2014/0270680 A1 | 9/2014 | Bloch et al. | |
| 2014/0282013 A1 | 9/2014 | Amijee | |
| 2014/0282642 A1 | 9/2014 | Needham et al. | |
| 2014/0380167 A1 | 12/2014 | Bloch et al. | |
| 2015/0007234 A1 | 1/2015 | Rasanen et al. | |
| 2015/0012369 A1 | 1/2015 | Dharmaji et al. | |
| 2015/0015789 A1 | 1/2015 | Guntur et al. | |
| 2015/0046946 A1 | 2/2015 | Hassell et al. | |
| 2015/0058342 A1 | 2/2015 | Kim et al. | |
| 2015/0067723 A1 | 3/2015 | Bloch et al. | |
| 2015/0104155 A1 | 4/2015 | Bloch et al. | |
| 2015/0179224 A1 | 6/2015 | Bloch et al. | |
| 2015/0181271 A1 | 6/2015 | Onno et al. | |
| 2015/0181301 A1 | 6/2015 | Bloch et al. | |
| 2015/0185965 A1 | 7/2015 | Belliveau et al. | |
| 2015/0195601 A1 | 7/2015 | Hahm | |
| 2015/0199116 A1 | 7/2015 | Bloch et al. | |
| 2015/0201187 A1 | 7/2015 | Ryo | |
| 2015/0258454 A1 | 9/2015 | King et al. | |
| 2015/0293675 A1 | 10/2015 | Bloch et al. | |
| 2015/0294685 A1 | 10/2015 | Bloch et al. | |
| 2015/0304698 A1 | 10/2015 | Redol | |
| 2015/0331942 A1 | 11/2015 | Tan | |
| 2016/0062540 A1 | 3/2016 | Yang et al. | |
| 2016/0066051 A1 | 3/2016 | Caidar et al. | |
| 2016/0104513 A1 | 4/2016 | Bloch et al. | |
| 2016/0105724 A1 | 4/2016 | Bloch et al. | |
| 2016/0132203 A1 | 5/2016 | Seto et al. | |

(56) References Cited

U.S. PATENT DOCUMENTS

| | | | |
|---|---|---|---|
| 2016/0162179 | A1 | 6/2016 | Annett et al. |
| 2016/0170948 | A1 | 6/2016 | Bloch |
| 2016/0173944 | A1 | 6/2016 | Kilar et al. |
| 2016/0192009 | A1 | 6/2016 | Sugio et al. |
| 2016/0217829 | A1 | 7/2016 | Bloch et al. |
| 2016/0224573 | A1 | 8/2016 | Shahraray et al. |
| 2016/0277779 | A1 | 9/2016 | Zhang et al. |
| 2016/0303608 | A1 | 10/2016 | Jossick |
| 2016/0322054 | A1 | 11/2016 | Bloch et al. |
| 2016/0323608 | A1 | 11/2016 | Bloch et al. |
| 2017/0062012 | A1 | 3/2017 | Bloch et al. |
| 2017/0142486 | A1 | 5/2017 | Masuda |
| 2017/0178409 | A1 | 6/2017 | Bloch et al. |
| 2017/0178601 | A1 | 6/2017 | Bloch et al. |
| 2017/0195736 | A1 | 7/2017 | Chai et al. |
| 2017/0289220 | A1 | 10/2017 | Bloch et al. |
| 2017/0295410 | A1 | 10/2017 | Bloch et al. |
| 2018/0025078 | A1 | 1/2018 | Quennesson |
| 2018/0068019 | A1 | 3/2018 | Novikoff et al. |

FOREIGN PATENT DOCUMENTS

| | | | |
|---|---|---|---|
| DE | 10053720 A1 | 4/2002 | |
| EP | 0965371 A2 | 12/1999 | |
| EP | 1033157 A2 | 9/2000 | |
| EP | 2104105 A1 | 9/2009 | |
| GB | 2359916 A | 9/2001 | |
| GB | 2428329 A | 1/2007 | |
| JP | 2008005288 A | 1/2008 | |
| KR | 2004-0005068 A | 1/2004 | |
| KR | 2010-0037413 A | 4/2010 | |
| WO | WO-1996/013810 A1 | 5/1996 | |
| WO | WO-2000/059224 A1 | 10/2000 | |
| WO | WO-2007/062223 A2 | 5/2007 | |
| WO | WO-2007/138546 A2 | 12/2007 | |
| WO | WO-2008/001350 A2 | 1/2008 | |
| WO | WO-2008/057444 A2 | 5/2008 | |
| WO | WO-2008052009 A2 | 5/2008 | |
| WO | WO-2009/137919 A1 | 11/2009 | |

OTHER PUBLICATIONS

Archos Gen 5 English User Manual Version 3.0, Jul. 26, 2007, pp. 1-81.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
Supplemental European Search Report for EP10774637.2 (PCT/IL2010/000362) dated Jun. 20, 2012 (6 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Yang, H, et al., "Time Stamp Synchronization in Video Systems," Teletronics Technology Corporation, <http://www.ttcdas.com/products/daus encoders/pdf/ tech papers/tp 2010 time stamp video system. pdf>, Abstract, (8 pages).
U.S. Appl. No. 13/622,780, Systems and Methods for Constructing Multimedia Content Modules, filed Sep. 19, 2012.
U.S. Appl. No. 13/622,795, Progress Bar for Branched Videos, filed Sep. 19, 2012.
U.S. Appl. No. 13/838,830, Systems and Methods for Synchronization of Selectably Presentable Media Streams, filed Mar. 15, 2013.
U.S. Appl. No. 13/921,536, Systems and Methods for Multiple Device Interaction with Selectably Presentable Media Streams, filed Jun. 19, 2013.
Barlett, Mitch, "iTunes 11: How to Queue Next Song," *Technipages*, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", *Entertainment Computing A ICEC 2009*, Sep. 3, 2009, pp. 98-109.
International Search Report and Written Opinion for International Patent Application PCT/IB2013/001000 dated Jul. 31, 2013 (12 pages).
Sodagar, I., (2011) "The MPEG-DASH Standard for Multimedia Streaming Over the Internet", *IEEE Multimedia*, IEEE Service Center, New York, NY US, vol. 18, No. 4, pp. 62-67.
Supplemental European Search Report for EP13184145 dated Jan. 30, 2014 (6 pages).
U.S. Appl. No. 12/706,721, now U.S. Pat. No. 9,190,110 Published as US2010/0293455, System and Method for Assembling a Recorded Composition, filed Feb. 17, 2010.
U.S. Appl. No. 14/884,285, System and Method for Assembling a Recorded Composition, filed Oct. 15, 2015.
U.S. Appl. No. 14/069,694, now U.S. Pat. No. 9,271,015 Published as US2014/0178051, Systems and Methods for Loading More Than One Video Content at a Time, filed Nov. 1, 2013.
U.S. Appl. No. 13/622,795, now U.S. Pat. No. 9,009,619 Published as US2014/0082666, Progress Bar for Branched Videos, filed Sep. 19, 2012.
U.S. Appl. No. 14/639,579 Published as US2015/0199116, Progress Bar for Branched Videos, filed Mar. 5, 2015.
U.S. Appl. No. 13/838,830, now U.S. Pat. No. 9,257,148 Published as US2014/0270680, System and Method for Synchronization of Selectably Presentable Media Streams, filed Mar. 15, 2013.
U.S. Appl. No. 14/984,821, System and Method for Synchronization of Selectably Presentable Media Streams, filed Dec. 30, 2015.
U.S. Appl. No. 14/335,381 Published as US2015/0104155, Systems and Methods for Real-Time Pixel Switching, filed Jul. 18, 2014.
U.S. Appl. No. 14/139,996 Published as US2015/0181301, Methods and Systems for In-Video Library, filed Dec. 24, 2013.
U.S. Appl. No. 14/140,007 Published as US2015/0179224, Methods and Systems for Seeking to Non-Key Frames, filed Dec. 24, 2013.
U.S. Appl. No. 14/249,627 Published as US2015/0294685, Systems and Methods for Creating Linear Video From Branched Video, filed Apr. 10, 2014.
U.S. Appl. No. 14/249,665 Published as US2015/0293675, Dynamic Timeline For Branched Video, filed Apr. 10, 2014.
U.S. Appl. No. 14/700,845, Systems and Methods for Nonlinear Video Playback Using Linear Real-Time Video Players, filed Apr. 30, 2015.
U.S. Appl. No. 14/700,862, Systems and Methods for Seamless Media Creation, filed Apr. 30, 2015.
U.S. Appl. No. 14/835,857, Systems and Methods for Adaptive and Responsive Video, filed Aug. 26, 2015.
U.S. Appl. No. 14/978,464, Intelligent Buffering of Large-Scale Video, filed Dec. 22, 2015.
U.S. Appl. No. 14/978,491, Seamless Transitions in Large-Schale Vidoe, filed Dec. 22, 2015.
U.S. Appl. No. 15/085,209, Media Stream Rate Synchronization, filed Mar. 30, 2016.
U.S. Appl. No. 12/706,721 Published as US2010/0293455, System and Method for Assembling a Recorded Composition, filed Feb. 17, 2010.
U.S. Appl. No. 13/033,916 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 13/437,164, now U.S. Pat. No. 8,600,220 Published as US2013/0259442, Systems and Methods for Loading More Than One Video Content at a Time, filed Apr. 2, 2012.
U.S. Appl. No. 14/069,694 Published as US2014/0178051, Systems and Methods for Loading More Than One Video Content at a Time, filed Nov. 1, 2013.

(56) References Cited

OTHER PUBLICATIONS

U.S. Appl. No. 13/622,780, now U.S. Pat. No. 8,860,882 Published as US2014/0078397, Systems and Methods for Constructing Multimedia Content Modules, filed Sep. 19, 2012.
U.S. Appl. No. 13/622,795 Published as US2014/0082666, Progress Bar for Branched Videos, filed Sep. 19, 2012.
U.S. Appl. No. 14/639,579, Progress Bar for Branched Videos, filed Mar. 5, 2015.
U.S. Appl. No. 13/838,830 Published as US2014/0270680, System and Method for Synchronization of Selectably Presentable Media Streams, filed Mar. 15, 2013.
U.S. Appl. No. 13/921,536 Published as US2014/0380167, Systems and Methods for Multiple Device Interaction with Selectably Presentable Media Streams, filed Jun. 19, 2013.
U.S. Appl. No. 14/139,996, Methods and Systems for In-Video Library, filed Dec. 24, 2013.
U.S. Appl. No. 14/249,627, Systems and Methods for Creating Linear Video From Branched Video, filed Apr. 10, 2014.
U.S. Appl. No. 14/249,665, Dynamic Timeline for Branched Video, filed Apr. 10, 2014.
U.S. Appl. No. 14/509,700, Systems and Methods for Dynamic Video Bookmarking, filed Oct. 8, 2014.
U.S. Appl. No. 14/534,626, Systems and Methods for Parallel Track Transitions, filed Nov. 6, 2014.

* cited by examiner

No interaction

| Pre-roll Segment 1 | Primary Content |
|---|---|
| 101 | 120 |

FIG. 1A

One interaction

| Pre-roll Segment 1 | Pre-roll Segment 2 | Primary Content |
|---|---|---|
| 101 | 103 | 120 |

FIG. 1B

Two interactions

| Pre-roll Segment 1 | Pre-roll Segment 2 | Pre-roll Segment 3 | Primary Content |
|---|---|---|---|
| 101 | 103 | 105 | 120 |

FIG. 1C

METHODS AND SYSTEMS FOR UNFOLDING VIDEO PRE-ROLL

CROSS-REFERENCE TO RELATED APPLICATION

This application claims priority to and the benefit of U.S. provisional patent application No. 61/872,005, entitled "Unfolding Pre-Roll," and filed on Aug. 30, 2013, the entirety of which is incorporated by reference herein.

BACKGROUND

The present disclosure relates generally to dynamic video playback, and more particularly to methods and systems for seamlessly extending streaming video rolls based on viewer interactions.

Online viewable media, such as streaming videos or songs, are often accompanied by commercial segments (e.g., ten- to thirty-second videos or sound recordings) that are required to be played in part or in full before a viewer can watch or listen to desired media content. These generally brief segments can appear before the media content (pre-roll), after the media content (post-roll) and, if the media content is long, they can also appear at other points (e.g., the middle) of the media content (mid-roll).

Pre-rolls are usually non-interactive short videos that are often similar to traditional television or radio commercials, but various interactive types exist when applied to online media content, such as: (1) polite pre-rolls (also known as dismissible pre-rolls), which allow the commercial content to be skipped; (2) overlay advertisements, which have a user interface (UI) overlay that performs an action upon a viewer's interaction with the UI (e.g., stop playback of the commercial, open a link to a related website, submit/share the commercial on a social network, open a video gallery, etc.); (3) ad selectors, which allow a viewer to select one advertisement to watch from a list of available advertisements; and (4) real-time targeted advertisements, which can be presented to a viewer based on, e.g., demographic information associated with the viewer. What is needed, however, are pre-rolls, mid-rolls, and post-rolls that dynamically vary in response to user interaction.

SUMMARY

In one aspect, a computer-implemented method includes presenting to a viewer an unfolding video in temporal proximity to a portion of a fixed-length primary video. The unfolding video has a variable play length that can be extended by adding seamlessly connected video segments, and is presented continuously without interruption as it is unfolded.

In one implementation, the unfolding video is a pre-roll, mid-roll, and/or post-roll. The unfolding video can be, for example, an interactive advertisement. For playback of an initial segment of the unfolding video, payment can be received on a CPM basis, whereas for playback of additional segments, payment can be received on a CPE and/or CPA basis.

In another implementation, the unfolding video is a first unfolding video, and at least a portion of the primary video is presented after playback of the first unfolding video. Further, after playback of the primary video portion, a second variable-length unfolding video segment is presented. The initial segment of the second unfolding video is selected for playback based on an interaction received from the viewer during the playback of the first unfolding video.

In yet another implementation, during playback of the unfolding video, the viewer is provided with a decision period during which he can interact with the unfolding video by selecting an option that affects playback of the unfolding video. During the decision period, a visual representation of an amount of time left to select an option can be displayed.

In one implementation, the added segment is one of several segments that seamlessly connect to a preceding video segment. The added segment is further selected for addition to the unfolding video based on the viewer interaction with the video.

In another implementation, multiple seamlessly connected video segments are added to the unfolding video based on interactions received from the viewer during playback of the unfolding video.

In another aspect, a system includes at least one computer configured to present to a viewer an unfolding video in temporal proximity to a portion of a fixed-length primary video. The unfolding video has a variable play length that can be extended by adding seamlessly connected video segments, and is presented continuously without interruption as it is unfolded.

In one implementation, the unfolding video is a pre-roll, mid-roll, and/or post-roll. The unfolding video can be, for example, an interactive advertisement. For playback of an initial segment of the unfolding video, payment can be received on a CPM basis, whereas for playback of additional segments, payment can be received on a CPE and/or CPA basis.

In another implementation, the unfolding video is a first unfolding video, and the video player presents at least a portion of the primary video after playback of the first unfolding video. Further, after playback of the primary video portion, the video player presents a second variable-length unfolding video segment. The initial segment of the second unfolding video is selected for playback based on an interaction received from the viewer during the playback of the first unfolding video.

In yet another implementation, during playback of the unfolding video, the video player provides the viewer with a decision period during which he can interact with the unfolding video by selecting an option that affects playback of the unfolding video. During the decision period, the video player can display a visual representation of an amount of time left to select an option.

In one implementation, the added segment is one of several segments that seamlessly connect to a preceding video segment. The video player selects the added segment for addition to the unfolding video based on the viewer interaction with the video.

In another implementation, the video player adds multiple seamlessly connected video segments to the unfolding video based on interactions received from the viewer during playback of the unfolding video.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 1A-1C are example diagrams of an unfolding pre-roll video having multiple segments.

DETAILED DESCRIPTION

Figure 2:
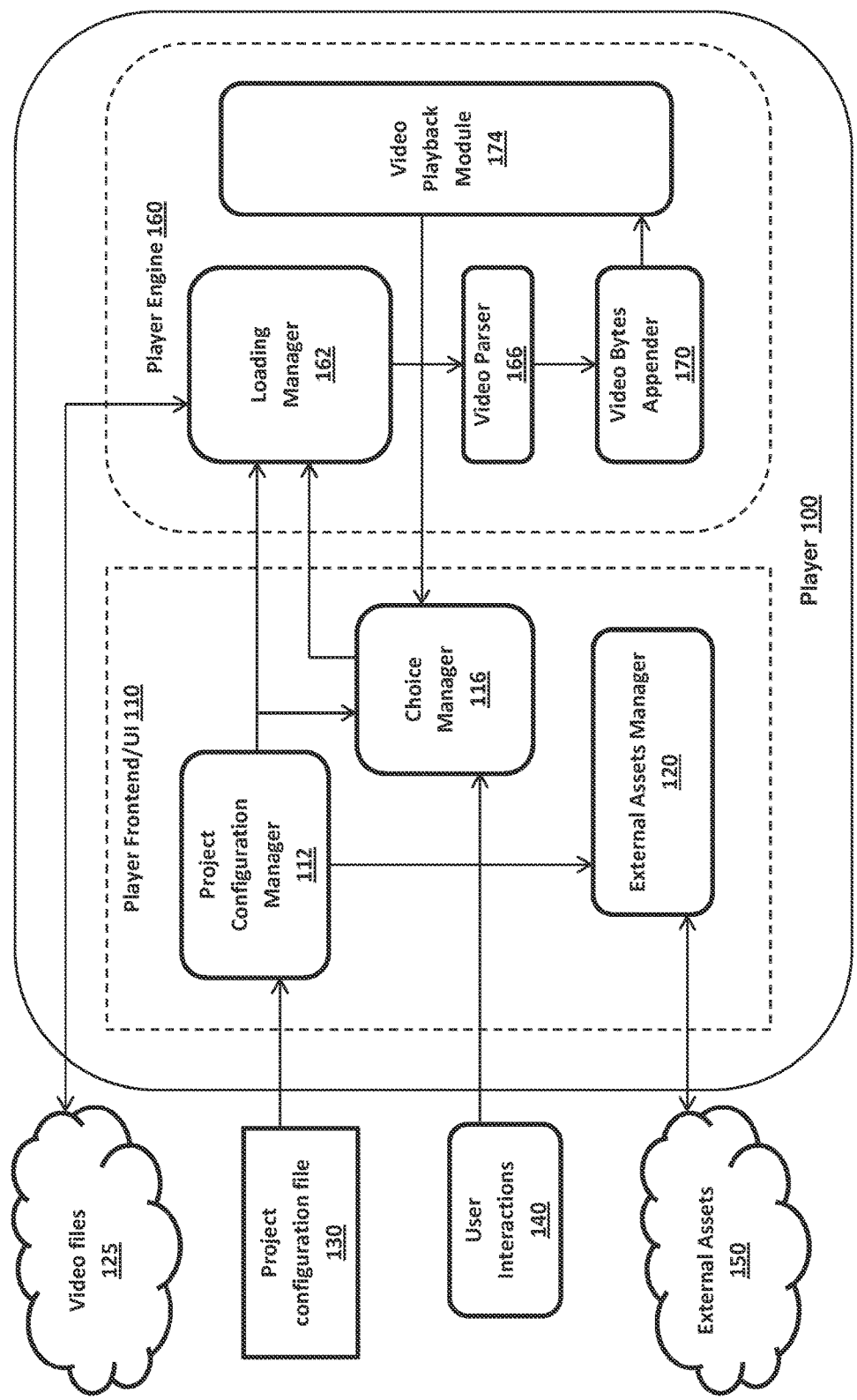
FIG. 2 is an example system diagram of a video player for playing unfolding pre-roll videos.

Described herein are various implementations of methods and supporting systems for presenting seamlessly unfolding multimedia content in a video pre-roll. In particular, a viewer is presented with video or other multimedia segments that adjoin primary content, such as a streaming television show, video-on-demand, or web-based video. Based on the viewer's interaction with the pre-roll, the pre-roll dynamically expands, or "unfolds," allowing the viewer to observe additional content segments that may be related to and/or based on the viewer's selections. The unfolding pre-roll can be utilized on various online video platforms and in various markets, such as music, advertising, television, and film. Of note, while the term "pre-roll" is primarily used throughout the present disclosure to illustrate the present concepts, it is to be appreciated that the term encompasses various types of multimedia segments, including post-rolls and mid-rolls.

Referring to FIGS. 1A-1C, in one implementation, an unfolding pre-roll begins similarly to a standard pre-roll video, but at some point during the first pre-roll video segment 101 (e.g., upon reaching a decision point or time period), the viewer is presented with an opportunity to make in-video choice. The pre-roll can continue to play while waiting for the user to make a choice. If the viewer chooses not to interact with the pre-roll video segment 101 before the end of an associated decision period, the pre-roll can end, similarly to a standard pre-roll video, and the primary content 120 is then presented (FIG. 1A). On the other hand, if the viewer interacts and selects one of the options presented, the pre-roll video unfolds by playing an additional pre-roll video segment 103 that can be seamlessly connected to the previous segment 101 (FIG. 1B). At the end or at some other point in the second pre-roll segment 103, another choice can be presented and, if the viewer interacts appropriately, a third video segment 105 is added to the pre-roll (FIG. 1C). The pre-roll video continues if the viewer interacts in a manner suggesting the viewer wishes additional content to be displayed. Alternatively, the pre-roll video can pause or stop if the viewer stops interacting, if the user requests to stop, or if the end of the full pre-roll video is reached. When stopping, the pre-roll video can either stop at the end of the current segment or be followed by a transitional end segment of appropriate length that comes after the last-played pre-roll segment and before the primary content 120. After the pre-roll ends the primary video content 120 can begin.

The present techniques can be used in conjunction with seamlessly assembled and selectably presentable multimedia content, such as that described in U.S. patent application Ser. No. 13/033,916, filed Feb. 24, 2011, and entitled "System and Method for Seamless Multimedia Assembly," the entirety of which is incorporated by reference herein. Selectably presentable multimedia content can include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the viewer the appearance of watching a single, linear multimedia presentation.

In some instances, the viewer is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the viewer's choices made before or during playback of content, one or more subsequent multimedia segment(s) associated with the choices can be presented to the viewer. In some implementations, the subsequent segment is played immediately and automatically following the conclusion of the current segment, whereas in other implementations, the subsequent segment is played immediately upon the viewer's interaction with the video, without waiting for the end of the decision period or the segment itself.

If a viewer does not make a selection at a decision point or during a decision period, a default or random selection can be made by the system. In some instances, the viewer is not provided with options; rather, the system automatically selects the segments that will be shown based on information that is associated with the viewer, other viewers, or other factors, such as the current date. For example, the system can automatically select subsequent segments based on the viewer's IP address, location, time zone, the weather in the viewer's location, social networking ID, saved selections, and so on. The system can also automatically select segments based on previous selections made by other viewers, such as the most popular suggestion or shared selections. The information can also be displayed to the viewer in the video, e.g., to show the viewer why an automatic selection is made. As one example, video segments of an unfolding pre-roll can be automatically selected for presentation based on the geographical location of three different viewers: a viewer in Canada will see a twenty-second beer commercial segment followed by an interview segment with a Canadian citizen; a viewer in the US will see the same beer commercial segment followed by an interview segment with a US citizen; and a viewer in France is shown only the beer commercial segment.

Multimedia segment(s) selected automatically or by a viewer can be presented immediately following a currently playing segment, or can be shown after other segments are played. Further, the selected multimedia segment(s) can be presented to the viewer immediately after selection, after a fixed or random delay, at the end of a decision period, and/or at the end of the currently playing segment. Two or more combined segments form a seamless multimedia content path, and there can be multiple paths that a viewer can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the multimedia content along a content path can be performed by selecting among options that appear on and/or around the video while the video is playing. In some implementations, these options are presented to viewers at a decision point and/or during a decision period in a content segment. The display can hover and then disappear when the decision period ends or when an option has been selected. Further, a countdown or other visual, aural, or other sensory indicator can be presented during playback of content segment to inform the viewer of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the viewer selects options upon reaching segment decision points to determine subsequent content to be played. First, a video introduction segment is played for the viewer. Prior to the end of the segment, a decision point is reached at which the viewer can select the next segment to be played from a listing of choices. In this case, the viewer is presented with a choice as to who will sing the first verse of the song: a tall, female performer, or a short, male performer. The viewer is given an amount of time to make a selection (i.e., a decision period), after which, if no selection is made, a default segment will be automatically selected. The default can be a predefined or random selection. Of note, the media content continues to play during the time the viewer is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the viewer is presented with other choices at other decisions points, depending on which path of choices is followed. Ultimately, the viewer arrives at a final segment, having traversed a complete multimedia content path.

FIG. 2 depicts an exemplary video player 100 for playing unfolding multimedia segments (e.g., branching video segments used in a pre-roll). The video player 100 includes a player frontend 110 and a player engine 160. The player frontend 110 includes a Project Configuration Manager 112, Choice Manager 116, and External Assets Manager 120; and the player engine 160 includes a Loading Manager 162, Video Parser 166, Video Bytes Appender 170, and Video Playback Module 174.

The Project Configuration Manager 112 manages pre-roll configurations and retrieves and parses external configuration files. In one implementation, the Project Configuration Manager 112 reads from a project configuration file 130 that stores a content path structure of a pre-roll. Specifically, the structure defines how multimedia content segments can be linked together in various manners to form one or more pre-roll content paths (e.g., a branching video tree in an unfolding pre-roll). The project configuration file 130 can further specify which audio, video, and/or other media files correspond to each content segment, i.e., which audio, video, and/or other media should be retrieved when the video player 100 determines that a particular content segment should be played. Additionally, the project configuration file 130 can indicate the interface elements that should be displayed or otherwise presented to users, as well as the when the elements should be displayed, such that the audio, video, and interactive elements of the pre-roll are synchronized. The project configuration file 130 can be stored on a device associated with the video player 100 or can be remotely accessed by the Project Configuration Manger 112.

In some implementations, the project configuration file 130 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. patent application Ser. No. 13/437,164, filed Apr. 2, 2012, and entitled "Systems and Methods for Loading More Than One Video Content at a Time," the entirety of which is incorporated by reference herein.

As earlier indicated, the Project Configuration Manager 112 can reference the project configuration file 130 to determine which interface elements should be displayed to viewers. The project configuration file 130 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. patent application Ser. No. 13/622,795, filed Sep. 19, 2012, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In some instances, the Project Configuration Manager 112 interfaces with the Loading Manager 162 and Choice Manager 116. In particular, the Project Configuration Manager 112 can provide the Loading Manager 162 with the path structure defined by the project configuration file 130, and notify the Loading Manager 162 of the availability of web-based video files 125 based on the path structure. The Project Configuration Manager 112 can also set the choices of the Choice Manager 116 and the configuration of the External Assets Manager 120.

The Choice Manager 116 receives user interactions 140 (e.g., mouse clicks, keyboard presses, touchpad presses, eye movements, etc.) that can be translated into actions associated with the pre-roll (e.g., segment selections, playback controls, etc.) and notifies the Loading Manager 162, which processes the actions as further described below. In addition to receiving user interactions 140, the Choice Manager 116 can receive other events or data, such as video and/or audio recorded previously or in real-time by the user, images, text (e.g., real-time chat) or other data uploads, such as information associated with the device user (e.g., user name, avatar, social networking account information, demographics, etc.), or the device itself (e.g., GPS location, device type, device model, etc.). The events, actions, and/or data can be provided to the Choice Manager 116 automatically, or as a result of an action taken by the user. The Choice Manager 116 can also interface with the Project Configuration Manager 112. For example, the Project Configuration Manager 112 can inform the Choice Manager 116 of the path structure defined by the project configuration file 130, which the Choice Manager 116 can use to determine the next multimedia content segments(s) that should be played for the viewer.

The Choice Manager 116 can interface with the Loading Manager 162 and the Video Playback Module 174. In particular, the Choice Manager 116 can accept notification of current or upcoming segment junctions from the Video Playback Module 174, and cause user interface elements to be displayed to the viewer in response. The Choice Manager can also listen for user interactions 140 and notify the Loading Manager 162 when an interaction by the viewer (e.g., a selection of an option displayed in the pre-roll) has occurred. In some implementations, based on its analysis of received events, the Choice Manager 116 causes the presentation of various forms of sensory output, such as visual, aural, tactile, olfactory, and the like.

The External Assets Manager 120 manages the external assets 150 associated with a pre-roll multimedia presentation, including user interface elements such as segment choice buttons/thumbnails, splash screens, timers, playback control buttons, transport bars, and other visual and/or audio interactive or display elements. In some implementations, the External Assets Manager 120 causes the display of real-time status messages or other indications of activities performed on user devices; e.g., how many and/or which users voted for a particular option, information about users (photo, Facebook user name, etc.), the options selected by the users, and so on. Upon direction from the Project Configuration Manager 112, the External Assets Manager 120 fetches external assets 150 necessary for display or playback in accordance with the timeline of the pre-roll.

The Loading Manager 162 manages the downloading of hosted streaming media according to a loading logic. In one implementation, the Loading Manager 162 receives the pre-roll path structure from the Project Configuration Manager 112 and events from the Choice Manager 116 (e.g., user or system choices) and, based on the path structure and events, determines which segments of the pre-roll to download and/or buffer (e.g., if the segments are remotely stored). For example, if the Choice Manager 116 informs the Loading Manager 162 that a particular segment A will be played at an upcoming point in the timeline, the Loading Manager 162 can intelligently request the segment for download, in advance of playback or notification of potential playback, additional media segments X, Y and Z that can be played following segment A. The downloading can occur even if fewer than all of X, Y, Z will be played (e.g., if X, Y and Z are potential segment choices branching off segment A).

In some implementations, the Loading Manager 162 ceases or cancels downloading of content segments or other media if it determines that it is no longer possible for a particular media content segment (or other content) to be presented on a currently traversed media path. Referring the above example, a user interacts with the pre-roll such that segment Y is determined to be the next segment that will be played. The interaction can be received by the Choice Manager 116, which then informs the Loading Manager 162 of the event and, based on the Loading Manager's 162 knowledge of the path structure of the pre-roll, the Loading Manager 162 can stop active downloads or dequeue pending downloads of content segments no longer reachable now that segment Y has been selected.

The Video Parser 166 receives media content from the Loading Manager 162 and analyzes and/or modifies the raw video or other media content, for example, to concatenate two separate media streams into a single timeline. The Video Parser 166 can also insert cue points and other event markers, such as junction events, into media streams. The Video Bytes Appender 170 processes media content output by the Video Parser 166. In particular, the Video Bytes Appender 170 can form one or more streams of bytes from multiple video, audio or other media streams, and feed the formed streams to the Video Playback Module 170 such that there is seamless playback of the combined media content. The Video Playback Module 170 presents the pre-roll to the viewer, and can also notify the Choice Manager 116 of events using cue points embedded within the video stream by the Video Parser 166.

In some implementations, the video player 100 tracks data regarding user interactions, users, and/or player devices, and provides the data to an analytics server. Collected analytics can include, but are not limited to: the number, type, and/or location of a device; user data, such as login information, name, address, age, sex, and the like; user interactions, such as button/touchpad presses, mouse clicks, mouse/touchpad movements, interaction timings, and the like; decisions made by users or automatically (e.g., content segment user choices or default selections); and content paths followed in the presentation content structure. The analytics can include those described in U.S. patent application Ser. No. 13/034, 645, entitled "System and Method for Data Mining within Interactive Multimedia," and filed Feb. 24, 2011, the entirety of which is incorporated by reference herein.

Viewers/users can interact with the video player 100 through various input devices, such as desktop computers, laptops, televisions, smartphones, smart glasses, cellular phones, tablets, gaming devices, DVD players, media players, set-top boxes, and a device having a suitable input interface such as a keyboard, mouse, trackball, touchpad, touchscreen, remote control, eye tracker, motion tracker, microphone, and the like. The video player 100 presents the pre-roll to users/viewers via output devices, such as desktop computers, laptops, televisions, smartphones, cellular phones, tablets, smart glasses, gaming devices, DVD players, media players, set-top boxes, and/or any devices having a suitable visual display, audio, and/or other sensory output interface such as a display screen, projector, speaker, and the like. A single device can perform both input and output functions. For example, a smartphone can allow a user to provide input using a touchscreen, while viewing the pre-roll on the display screen of the phone. Alternatively, a single device can have both input and output capabilities, but may be used for only input or output. For example, the smartphone can be used as an input device to interact with a video that is being played on a television.

More generally, the functions provided by the video player 100 can be implemented in any appropriate hardware or software. If implemented as software, the invention can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software downloaded to or existing on the viewer's device. Some of the functionality can exist remotely; for example, video encoding functions can be performed on one or more remote servers. In some implementations, the viewer's device serves only to provide output and input functionality, with the remainder of the processes being performed remotely.

The local and/or remote software can be implemented on hardware such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of a suitable programming languages, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that implementations of the present invention can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 3:
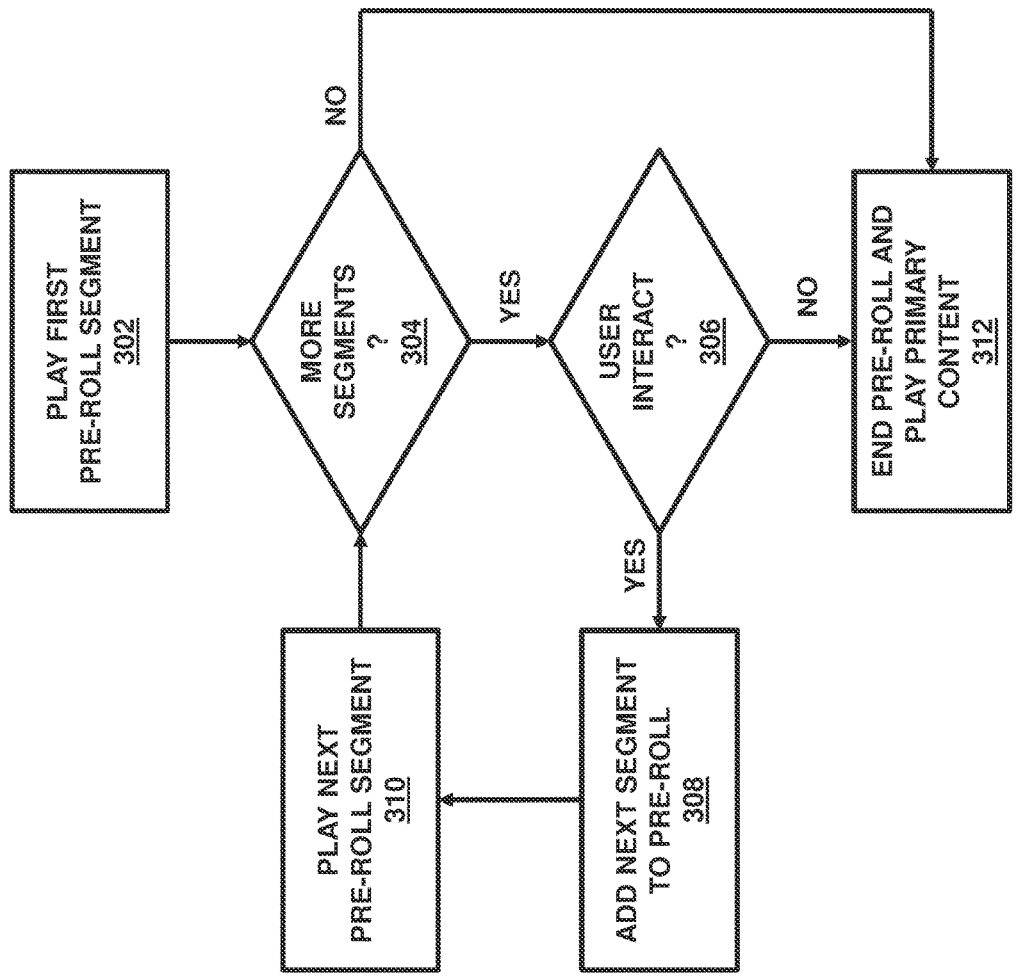
FIG. 3 is an example method for playing an unfolding pre-roll video.

FIG. 3 illustrates an exemplary method for presenting an unfolding, variable-length pre-roll (e.g., an advertisement) in temporal proximity to primary video content, which can be of fixed length (e.g., a television show). For a pre-roll, temporal proximity refers to presenting the pre-roll substantially immediately prior to presenting the primary video content; whereas, for a post-roll, temporal proximity refers to presenting the pre-roll substantially immediately after presenting the primary video content. For a mid-roll, temporal proximity refers to presenting at least a portion of the primary video content substantially immediately before the mid-roll and presenting a different portion of the primary video content substantially immediately after the end of the mid-roll.

In STEP 302, the video player 100 presents the first pre-roll segment to the viewer. If there is not at least one additional pre-roll segment that can be played (STEP 304), the pre-roll ends and the primary content is presented (STEP 312). If, however, potential additional pre-roll segments exist (STEP 304), the video player 100 awaits a viewer interaction during playback of the current pre-roll segment (STEP 306). As described above, the viewer can have a limited window of time to interact with the pre-roll; e.g., a 5-second countdown near the end of the segment during which three selectable options are presented to the viewer. If the viewer does not interact with the pre-roll video during the decision period, the pre-roll ends and the primary contented is presented to the viewer (STEP 312). On the other hand, if the viewer interacts with the currently playing pre-roll segment (e.g., selects one of the three options within the decision window), then an additional segment is added onto the pre-roll (STEP 308) and is presented to the viewer (STEP 310). The additional segment can be one of a plurality of possible segments that branch from the current segment, and the viewer's interaction with the current segment can determine which possible segment is added to the pre-roll. The additional segment can also be seamlessly appended to the pre-roll, such that no noticeable gap between segments is observable by the viewer.

Figure 4A:
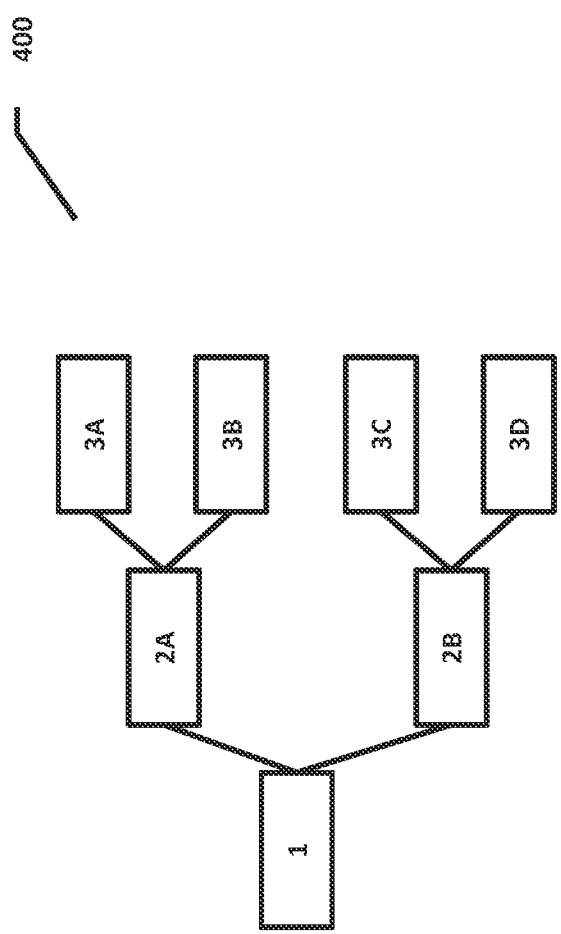
FIG. 4A is an example diagram of a path structure for an unfolding pre-roll video.
Figure 4B:
FIG. 4B is an example diagram of an unfolding pre-roll video based on the path structure from FIG. 4A.

In some implementations, a viewer interacts with the pre-roll video in real-time, while the video is playing and, as previously mentioned, can interact in a variety of manners, including mouse clicks, mouse movement, touchpad or touch screen gestures, eye movement, keyboard presses, voice commands, and so on. Each interaction can load a different video for the next segment of the pre-roll, such that the viewer not only decides if the next segment will play, but also which segment will play. FIG. 4A depicts an exemplary path structure 400 for a pre-roll video of three consecutive segments. After playback of the initial segment (SEGMENT 1), the viewer can interact with the initial pre-roll segment to select between two subsequent segments (SEGMENTS 2A and 2B). If the viewer selects SEGMENT 2A, he can then further interact with that segment to select between two final pre-roll segments (SEGMENTS 3A and 3B). Likewise, if the viewer selects SEGMENT 2B, he can further interact with that segment to select between two final pre-roll segments (SEGMENTS 3C and 3D). FIG. 4B illustrates the playback timeline of a pre-roll in which all three segments are played. As shown, a viewer has selected SEGMENTS 1, 2B and 3C prior to primary content 402 being shown.

In some implementations, an interaction with the pre-roll leads to something other than the unfolding of further pre-roll video. For example, an interaction with the pre-roll video can jump to a link within or outside of the video player, open a new browser window or application instance, put other images or interface elements on the video, and so on. Consider, for example, a viewer watching a pre-roll advertisement for an automobile company is presented with two options relating to car model: leisure or sport. If the viewer makes a selection, the ad unfolds and he is presented with another choice relating to the car color: red or blue. The next time that the viewer is presented with a choice, clicking one or more of the choices takes him to a dedicated landing page of the advertiser. Of note, the landing page can be based on choices he made during playback of the unfolding pre-roll (e.g., here, it can be a landing page showing the features of a red sports car).

In some implementations, after a user selects a close or cancel interface element a certain number of times (e.g., once, twice, three times, five times etc.), the video player 100 will play the full pre-roll video regardless of whether the user continues interacting with the pre-roll.

Figure 5:
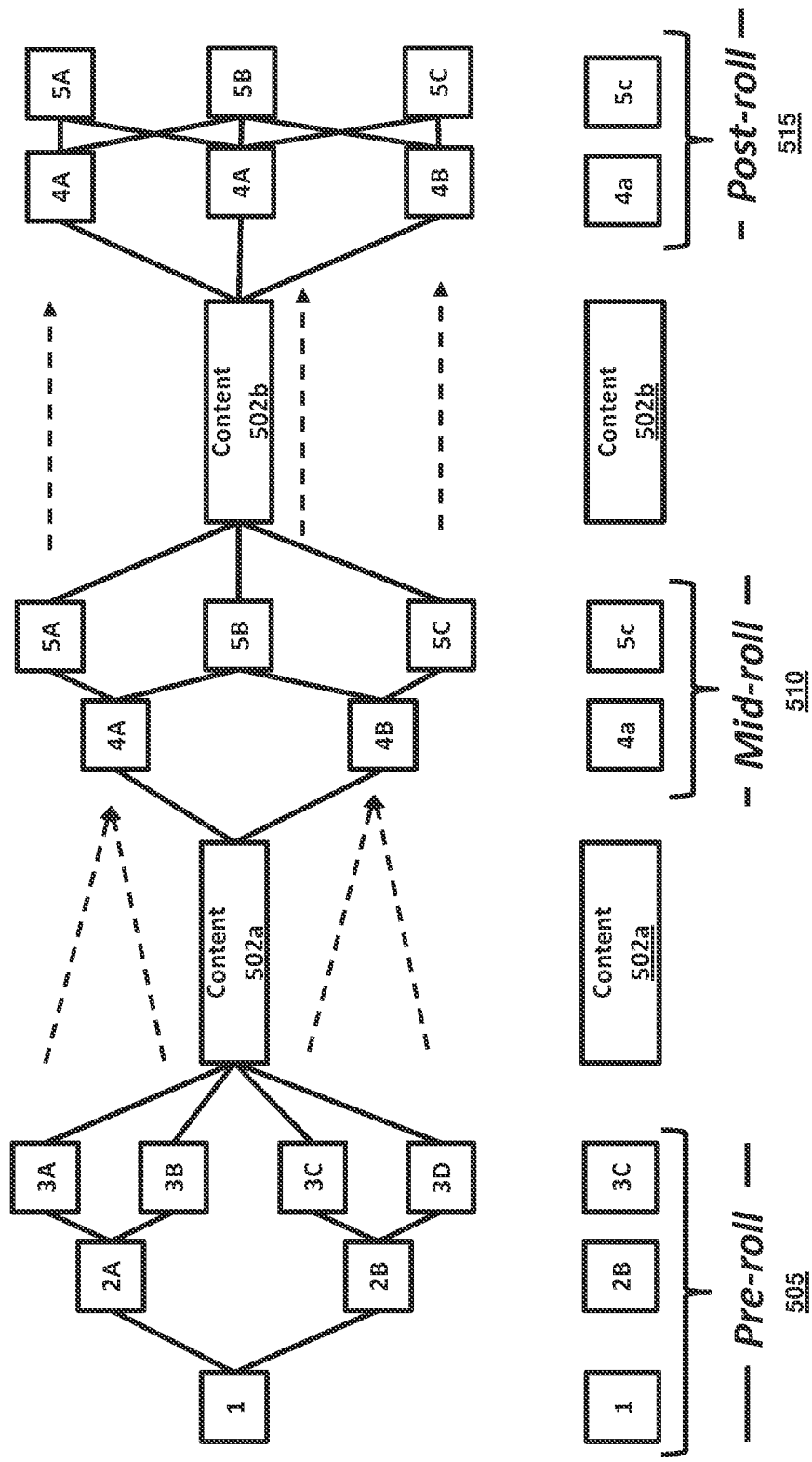
FIG. 5 is an example diagram of a path structure and segment dependencies for related unfolding pre-roll, mid-roll, and post-roll videos.

As previously mentioned, the features discussed herein with respect to pre-rolls can also be applied to mid-rolls and post-rolls. Of note, when a mid-roll and/or post-roll begins, its initial segment can depend upon the user's previous selections in a pre-roll or earlier mid-roll or post-roll. For example, if a viewer, by way of his interactions with the pre-roll, indicates that he is interested in beer instead of liquor, he can be shown an initial mid-roll or post-roll segment about beer instead of another possible initial segment related to liquor. To illustrate, FIG. 5 depicts a primary media content stream in two parts 502a and 502b (e.g., two halves of a comedy film), with three advertisement breaks (pre-roll 505, mid-roll 510, and post-roll 515). Each roll includes a branching path structure in which a viewer can traverse different paths and see different advertising content by making choices during playback of the advertisement video segments. As shown, the starting segment for the mid-roll 510 depends on at least one segment selection during playback of the pre-roll 505. Specifically, if the path with SEGMENT 2A is chosen, the mid-roll will begin with SEGMENT 4A. Conversely, if the path with SEGMENT 2B is chosen, the mid-roll will begin with SEGMENT 4B.

The relationships between pre-rolls, mid-rolls, and post-rolls can be complex, and the segment paths available to a viewer can depend on one or more choices made in one or more earlier rolls. For example, a choice made in a pre-roll can determine which segment will be shown first in a mid-roll or post-roll, and/or which paths of segments the viewer will be able to traverse. In one implementation, a mid-roll or post-roll can include an outcome of one or more previous rolls. For example, the previous rolls can include an interactive challenge, such as a quiz or a game, occurring over one or more of the rolls and using the mechanisms described herein. If the viewer successfully completes the challenge, he can be rewarded in a later roll (e.g., he can be rewarded with a coupon in a post-roll if he successfully completes a quiz in a pre-roll and/or mid-roll).

Referring still to FIG. 5, in one instance, if a viewer ends with SEGMENT 5A in the mid-roll, he will begin with SEGMENT 4A in the post-roll, with potential future segments including SEGMENTS 5A and 5B. If a viewer ends with SEGMENT 5B in the mid-roll, he will also begin with SEGMENT 4A in the post-roll, but SEGMENT 5C is now a potential future segment in addition to SEGMENTS 5A and 5B. If, alternatively, the viewer ends with SEGMENT 5C in the mid-roll, he begins with SEGMENT 4B in the post-roll, with SEGMENTS 5B and 5C being available future segment options. It is to be appreciated that various arrangements of video segments and dependencies among the segments are possible, and the examples described herein illustrate just a small number of the possibilities.

In one implementation, advertising payment models can be applied to unfolding pre-rolls, mid-rolls, and post-rolls, and advertisers can pay for views, clicks, and/or conversions according to these models. Exemplary models include (1) cost per mille (CPM), which counts impressions, i.e., how many viewers start watching the pre-roll video; (2) cost per engagement (CPE), which counts how many viewers engage with the video; (3) cost per action/acquisition (CPA), which counts how many viewers performed a certain action, such as making a purchase; and (4) cost per lead (CPL), which tracks, for example, how many times viewers were linked to an advertiser's website.

Figure 6:
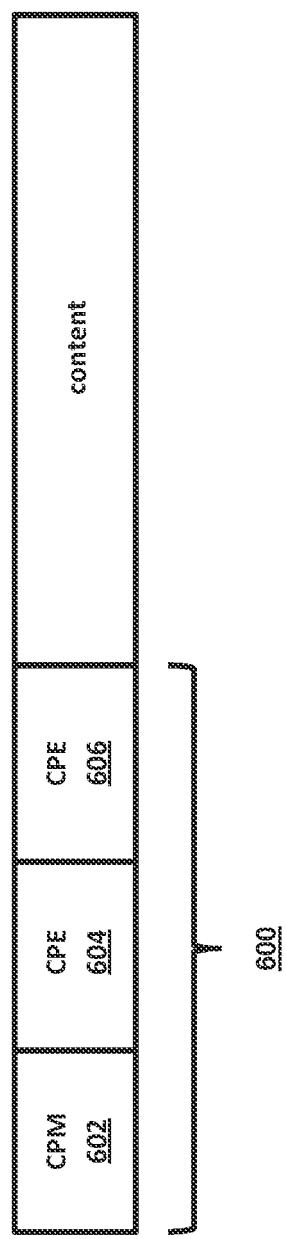
FIG. 6 is an example diagram of a payment model for an unfolding pre-roll video.

FIG. 6 depicts one implementation of an advertising payment model as applied to an unfolding roll video 600. Payment for playback of the initial video segment 602 is made according to a CPM model, because viewers will be directed to that portion of the pre-roll 600 without interaction. Payment for playback of subsequent segments 604 and 606, however, is made according to a CPE (or CPA) model, because in order to reach these segments, the viewer must have engaged with and unfolded the pre-roll 600. Thus, the pricing model can be CPM+CPE+CPE, meaning that the advertiser will pay only for CPM if the viewer doesn't interact with the pre-roll 600, but will pay additionally on a CPE or CPA basis for every additional user interaction resulting in the pre-roll 600 being unfolded. In some instances, if the pre-roll 600 ends with a lead to the advertiser's website, then the last pre-roll segment can include payment based on a CPL model. In another implementation, an option is presented to a viewer to choose among several advertisers at the beginning of the video, and only the advertiser whose ads are shown would need to pay.

In using a branching model for video segments, the video player 100 can also collect viewer choices and interactions (e.g., options selected on video segment by the viewer). The video player 100 can relay the collected data to an analytics server, which can provide advertisers and/or publishers with reports, not only about the number of times the viewer engaged an unfolding advertisement, but also on the options selected by the viewer. A report can appear as shown in Table 1, below, in which Viewer X engaged the unfolding video twice, Viewer Y didn't engage the video at all, and Viewer Z engaged the pre-roll three times and reached its end.

TABLE 1

|  | Viewer X | Viewer Y | Viewer Z |
|---|---|---|---|
| Segment 1 | 1 | 1 | 1 |
| Segment 2 | 2A |  | 2B |
| Segment 3 | 3A |  | 3D |
| Segment 4 |  |  | 4H |

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a viewer while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
providing an unfolding video having a variable play length, wherein the unfolding video comprises a plurality of video segments interconnected in the form of a video tree comprising a plurality of branching paths, wherein particular video segments in a particular path of the video tree are selectively presented to a viewer based at least in part on one or more viewer interactions with the unfolding video, and wherein the play length of the unfolding video is based on how many video segments in a particular branching path are presented to the viewer;
presenting to the viewer, in temporal proximity to at least a portion of a primary video having a fixed play length, a first video segment from the video tree of the unfolding video;
receiving an interaction with the first video segment of the unfolding video from the viewer during playback of the first video segment of the unfolding video; and
in response to the received interaction, extending the play length of the unfolding video by presenting at least a portion of a second video segment from a branching path of the video tree of the unfolding video, wherein the second video segment is seamlessly connected to the first video segment, and continuing to present the extended unfolding video without interruption;
wherein the branching path in the unfolding video being presented to the viewer comprises a plurality of video segments that comprise portions of and together form a single, comprehensive video advertisement, and wherein a payment for presenting the unfolding video to the user is calculated as a combination of a plurality of payment components each associated with a different portion of the unfolding video, at least a subplurality of the payment components being calculated using different bases, wherein a first one of the payment components is calculated based on serving to the user an impression comprising the first video segment of the unfolding video, and wherein a second one of the payment components is calculated based on extending the unfolding video to present at least the portion of the second video segment.

2. The method of claim 1, wherein the unfolding video comprises at least one of a pre-roll, a mid-roll, and a post-roll.

3. The method of claim 2, wherein the unfolding video comprises an interactive advertisement.

4. The method of claim 1, further comprising receiving payment on at least one of a cost per engagement (CPE) and a cost per action (CPA) basis for presenting to the viewer additional video segments from the video tree of the unfolding video.

5. The method of claim 1, wherein the unfolding video is a first unfolding video, the method further comprising:
storing one or more interactions received from the viewer during playback of the first unfolding video;
providing a second unfolding video having a variable play length, wherein the second unfolding video comprises a plurality of video segments interconnected in the form of a video tree comprising a plurality of branching paths, wherein particular video segments in a particular path of the video tree pf the second unfolding video are selectively presented to a viewer based at least in part on one or more viewer interactions with the second unfolding video, and wherein the play length of the second unfolding video is based on how many video segments in a particular branching path of the video tree of the second unfolding video are presented to the viewer;
selecting a starting video segment from the video tree of the second unfolding video based on the one or more stored interactions; and
following playback of the first unfolding video and at least a portion of the primary video, presenting to the viewer the starting video segment from the video tree of the second unfolding video.

6. The method of claim 1, further comprising providing to the viewer, during playback of the unfolding video, at least one decision period during which the viewer can select one of a plurality of options affecting playback of the unfolding video; and wherein the interaction comprises a selection of one of the options during the decision period.

7. The method of claim 6, further comprising presenting to the viewer, during the decision period, a visual representation of an amount of time remaining for selection of one of the options.

8. The method of claim 1, wherein the second video segment is one of a plurality of segment options that seamlessly connect to the first video segment; and wherein the second video segment is selected for addition to the unfolding video based on the interaction.

9. The method of claim 1, further comprising adding a plurality of seamlessly connected video segments to the unfolding video based on interactions received from the viewer during playback of the unfolding video.

10. A system comprising:
at least one computer configured to perform operations comprising:
providing an unfolding video having a variable play length, wherein the unfolding video comprises a plurality of video segments interconnected in the form of a video tree comprising a plurality of branching paths, wherein particular video segments in a particular path of the video tree are selectively presented to a viewer based at least in part on one or more viewer interactions with the unfolding video, and wherein the play length of the unfolding video is based on how many video segments in a particular branching path are presented to the viewer;
presenting to the viewer, in temporal proximity to at least a portion of a primary video having a fixed play length, a first video segment from the video tree of the unfolding video;
receiving an interaction with the first video segment of the unfolding video from the viewer during playback of the first video segment of the unfolding video; and
in response to the received interaction, extending the play length of the unfolding video by presenting at least a portion of a second video segment from a branching path of the video tree of the unfolding video, wherein the second video segment is seamlessly connected to the first video segment, and continuing to present the extended unfolding video without interruption;
wherein the branching path in the unfolding video being presented to the viewer comprises a plurality of video segments that comprise portions of and together form a single, comprehensive video advertisement, and
wherein a payment for presenting the unfolding video to the user is calculated as a combination of a plurality of payment components each associated with a different portion of the unfolding video, at least a subplurality of the payment components being calculated using different bases, wherein a first one of the payment components is calculated based on serving to the user an impression comprising the first video segment of the unfolding video, and wherein a second one of the payment components is calculated based on extending the unfolding video to present at least the portion of the second video segment.

11. The system of claim 10, wherein the unfolding video comprises at least one of a pre-roll, a mid-roll, and a post-roll.

12. The system of claim 11, wherein the unfolding video comprises an interactive advertisement.

13. The system of claim 10, wherein the operations further comprise receiving payment on at least one of a cost per engagement (CPE) and a cost per action (CPA) basis for presenting to the viewer additional video segments from the video tree of the unfolding video.

14. The system of claim 10, wherein the unfolding video is a first unfolding video; and wherein the operations further comprise:
storing one or more interactions received from the viewer during playback of the first unfolding video;
providing a second unfolding video having a variable play length, wherein the second unfolding video comprises a plurality of video segments interconnected in the form of a video tree comprising a plurality of branching paths, wherein particular video segments in a particular path of the video tree pf the second unfolding video are selectively presented to a viewer based at least in part on one or more viewer interactions with the second unfolding video, and wherein the play length of the second unfolding video is based on how many video segments in a particular branching path of the video tree of the second unfolding video are presented to the viewer;

selecting a starting video segment from the video tree of the second unfolding video based on the one or more stored interactions; and following playback of the first unfolding video and at least a portion of the primary video, presenting to the viewer the starting video segment from the video tree of the second unfolding video.

15. The system of claim 10, wherein the operations further comprise providing to the viewer, during playback of the unfolding video, at least one decision period during which the viewer can select one of a plurality of options affecting playback of the unfolding video; and wherein the interaction comprises a selection of one of the options during the decision period.

16. The system of claim 15, wherein the operations further comprise presenting to the viewer, during the decision period, a visual representation of an amount of time remaining for selection of one of the options.

17. The system of claim 10, wherein the second video segment is one of a plurality of segment options that seamlessly connect to the first video segment; and wherein the second video segment is selected for addition to the unfolding video based on the interaction.

18. The system of claim 10, wherein the operations further comprise adding a plurality of seamlessly connected video segments to the unfolding video based on interactions received from the viewer during playback of the unfolding video.

* * * * *